(12) United States Patent
Matsunaga

(10) Patent No.: US 6,421,362 B1
(45) Date of Patent: Jul. 16, 2002

(54) CHARGING AND DISCHARGING CIRCUIT FOR PULSE LASER

(75) Inventor: Takashi Matsunaga, Ninomiya-machi (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 09/526,719

(22) Filed: Mar. 16, 2000

(30) Foreign Application Priority Data

Mar. 19, 1999 (JP) .............................. 11-076945

(51) Int. Cl.[7] .............................. H01S 3/13; H01S 3/00; H02J 7/04
(52) U.S. Cl. ................. 372/38.02; 372/38.01; 372/38.04; 372/29.011; 372/29.012; 320/161
(58) Field of Search ................. 320/161; 372/29.01, 372/29.011, 29.012, 38.01, 38.02, 38.03, 38.04, 55, 87, 30

(56) References Cited

U.S. PATENT DOCUMENTS 5,754,579 A * 5/1998 Mizoguchi et al. ........... 372/58

* cited by examiner

Primary Examiner—Paul Ip
Assistant Examiner—Armando Rodriguez
(74) Attorney, Agent, or Firm—Armstrong, Westerman & Hattori, LLP

(57) ABSTRACT

A charging and discharging circuit for a pulse laser which enables the pulse laser to increase an oscillation frequency. A charging and discharging circuit for a pulse laser, comprising a high-voltage power supply (18) for charging a capacitor (C0) with electric charges until an interpolar voltage reaches a final target value VF, a discharging circuit (3) for discharging the electric charges in pulses between discharge electrodes (5, 5) to oscillate a pulse laser beam (11), and a laser controller (4) for calculating a final target value VF of an interpolar voltage VC for the next charging on the basis of the pulse light emission amount per pulse of the pulse laser beam and outputting the value to the high-voltage power supply, wherein the high-voltage power supply starts charging the capacitor with electric charges toward the predetermined primary target value V1 before the laser controller calculates the final target value VF of the interpolar voltage VC and wherein the charging is performed up to the final target value after the calculation thereof.

4 Claims, 4 Drawing Sheets

CHARGING AND DISCHARGING CIRCUIT FOR PULSE LASER

FIELD OF THE INVENTION

The present invention relates to a charging and discharging circuit for a pulse laser for use in an excimer laser or other gas laser unit.

BACKGROUND OF THE INVENTION

Conventionally, there is known a pulse laser for oscillating a laser beam in pulses by discharging at a predetermined frequency between discharge electrodes to excite laser medium such as excimer laser.

Referring to FIG. 6, there is shown a block diagram of a charging and discharging circuit for a pulse laser related to a prior art.

In FIG. 6, the charging and discharging circuit comprises a first capacitor C0, a high-voltage power supply 18 for charging the first capacitor C0 with high-voltage electric charges, and a discharging circuit 3 for applying these electric charges to a portion between discharge electrodes 5, 5. The electric charges applied to the portion between the discharge electrodes 5, 5 discharge between the discharge electrodes 5, 5 and excites a laser medium to oscillate a pulse laser beam 11. The oscillated pulse laser beam 11 reaches a processing machine 15 so as to be processed.

The high-voltage power supply 18 and the discharging circuit 3 are connected to a laser controller 4 for controlling laser oscillation. The high-voltage power supply 18 starts charging the first capacitor C0 together with an input of a charging command signal H1 from the laser controller 4. The discharging circuit 3 applies the electric charges which have been applied to the first capacitor C0 to the discharge electrodes 5, 5 together with an input of a trigger signal Tr from the processing machine 15.

If this type of a pulse laser is used for precision processing such as, for example, laser lithography, energy of the pulse laser beam 11 per pulse (hereinafter, pulse light emission amount) must be controlled precisely. For the precise control, an interpolar voltage VC applied across the first capacitor C0 need be controlled for each pulse.

In other words, the processing machine 15 measures the pulse light emission amount by using a light emitting monitor 12 after oscillating the pulse laser beam 11 and requests a pulse light emission amount for the next oscillation of the laser controller 4. This pulse light emission amount is called pulse light emission request amount Px and transmitted to the laser controller 4 by means of a pulse light emission amount request signal P. The laser controller 4 performs a predetermined arithmetic operation on the basis of this pulse light emission request amount Px to calculate a final target value VF of the interpolar voltage VC and transmits the value to the high-voltage power supply 18 by means of a target value signal VH.

Referring to FIG. 7, there is shown a timing chart of charging and discharging according to the prior art.

In FIG. 7, electric charges applied across the first capacitor C0 together with the input of the trigger signal Tr at time t1 are applied to a portion between the charging electrodes 5, 5, by which the pulse laser beam 11 is oscillated.

The laser controller 4 receives the pulse light emission request amount Px from the light emitting monitor 12 at time t2 after a completion of oscillating the pulse laser beam 11. On the basis of the pulse light emission request amount Px, the laser controller 4 performs an arithmetic operation for calculating the final target value VF of the interpolar voltage VC for charging the first capacitor C0 at the next pulse laser oscillation between the time t2 to time t3.

Subsequently at the time t3, the laser controller 4 transmits the calculated final target value VF by means of a target value signal VH to the high-voltage power supply and inputs a charging command signal H1 to the high-voltage power supply 18, by which the high-voltage power supply 18 starts charging the first capacitor C0. When the interpolar voltage VC reaches the final target value VF at time t4, the high-voltage power supply 18 terminates the charging and applies the electric charges to the portion between the electrodes 5, 5 together with an input of the trigger signal Tr at time t5. It causes discharging, by which the pulse laser beam 11 is oscillated.

The above prior art, however, has a problem as described below.

In other words, if the pulse light emission amount of the pulse laser beam 11 is the same, a processing amount per unit time in laser processing with the processing machine 15 is almost proportional to an oscillation frequency of the pulse laser. In order to increase the pulse light emission amount, the pulse laser needs to be large-sized and it leads to an increase of a device cost, and therefore it is required to increase the oscillation frequency of the pulse laser to perform a further large amount of processing in the same pulse laser. It is particularly needed for an excimer laser and a vacuum ultraviolet laser used as light sources for laser lithography for producing semiconductors.

According to the prior art, a time required from the pulse laser oscillation to the next oscillation mostly accounts for:

(1) time ts from the time t2 when the laser controller 4 starts the arithmetic operation of the final target value VF to the time t3 when the laser controller 4 terminates the arithmetic operation to specify the final target value VF for the high-voltage power supply 18 and (2) time tp from the time t3 when the charging is started to the time t4 when charging the first capacitor C0 is terminated.

In other words, to increase the oscillation frequency, the time ts and the time tp need to be reduced.

To reduce the time ts, however, an ability of performing the arithmetic operation of the laser controller 4 should be increased, and therefore an arithmetic unit such as an expensive computer is required. In addition, to reduce the time tp, a charging ability of the high-voltage power supply 18 should be increased, and therefore a large-sized and more expensive high-voltage power supply 18 is needed.

As described above, the prior art has a problem that an operation from discharging to a completion of the next charging takes a long time, so that it is hard to increase the oscillation frequency of the pulse laser beam 11.

SUMMARY OF THE INVENTION

The present invention is provided from a viewpoint of the above problem. It is an object of the present invention to provide a charging and discharging circuit for a pulse laser which enables the pulse laser to increase an oscillation frequency.

In order to achieve the above object, there is provided a charging and discharging circuit for a pulse laser according to a first aspect of the invention, comprising a high-voltage power supply for charging a capacitor with electric charges until an interpolar voltage of the capacitor reaches a final target value, a discharging circuit for discharging the electric charges in pulses between discharge electrodes to excite a laser medium and oscillating a pulse laser beam, a pulse monitor for detecting a pulse light emission amount per pulse of the pulse laser beam, and a laser controller for calculating a final target value of an interpolar voltage for the next charging of the capacitor on the basis of the pulse light emission amount after the laser oscillation and outputting the value to the high-voltage power supply, wherein the high-voltage power supply starts charging the capacitor with electric charges toward a predetermined primary target value before the laser controller calculates the final target value of the interpolar voltage of the capacitor and wherein the charging is performed up to the calculated final target value after the final target value is calculated.

According to the first aspect of the invention, the high-voltage power supply starts charging the capacitor between the poles thereof before the laser controller calculates the final target value on the basis of the pulse light emission amount of the pulse laser beam. Accordingly, the charging is continued during a time period in which the laser controller calculates the target value of the interpolar voltage, which reduces a time between the pulse laser beam oscillation and the completion of charging the capacitor, by which an oscillation frequency of the pulse laser beam can be increased.

According to a second aspect of the invention based on the first aspect of the invention, the high-voltage power supply starts primary charging of the capacitor with electric charges toward the primary target value, keeps the value which has reached the primary target value, and then performs final charging of the capacitor up to the final target value.

This ensures the same action and effect as for the first aspect of the invention.

According to a third aspect of the invention based on the first aspect of the invention, the high-voltage power supply starts primary charging of the capacitor with electric charges toward the primary target value and then performs final charging of the capacitor up to the final target value so that a charging amount per unit time always keeps a constant level.

This ensures the most efficient use of a charging ability of the high-voltage power supply in addition to the same action and effect as for the first aspect of the invention.

According to a fourth aspect of the invention based on the first aspect of the invention, the high-voltage power supply rapidly performs primary charging of the capacitor with electric charges toward the primary target value and after reaching the primary target value, gradually performs final charging of the capacitor up to the final target value.

This ensures a reduction of a time for the primary charging and an accuracy of reaching the final target value in the final charging in addition to the same action and effect as for the first aspect of the invention.

DETAILED DESCRIPTION OF THE PREFERRED EMBODIMENTS

Figure 1:
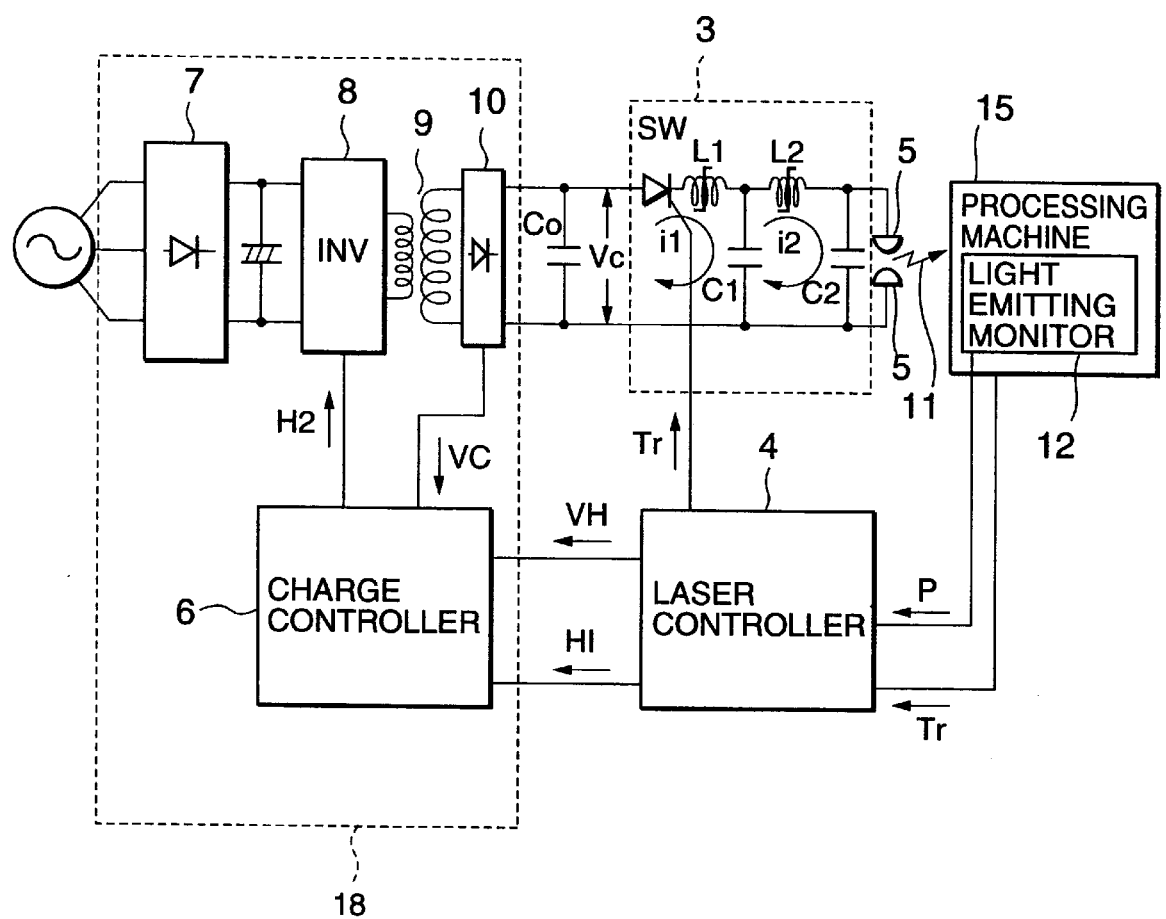
FIG. 1 is a block diagram of a charging and discharging circuit according to this embodiment.

An embodiment according to this invention will be described in detail below by using the accompanying drawings. In this embodiment, identical reference characters designate the same components as those in the drawing used for the above description of the prior art and their duplicated description will be omitted here.

The embodiment will be described below by referring to FIGS. 1 to 5.

Referring to FIG. 1, there is shown a block diagram of a charging and discharging circuit for a pulse laser according to this embodiment. In FIG. 1, the charging and discharging circuit comprises a first capacitor C0, a high-voltage power supply 18 for charging the first capacitor C0 with high-voltage electric charges, and a discharging circuit 3 for applying the electric charges to a portion between discharge electrodes 5, 5. The electric charges applied to the portion between the discharge electrodes 5, 5 cause discharging between the discharge electrodes 5, 5 and excites a laser medium to oscillate a pulse laser beam 11. The pulse laser beam 11 oscillated in pulses reaches a processing machine 15 so as to be processed. The high-voltage power supply 18 and the discharging circuit 3 are connected to a laser controller 4 for controlling laser oscillation.

The high-voltage power supply 18 comprises a charge controller 6 for controlling an interpolar voltage VC of the capacitor C0 on the basis of a command from the laser controller 4, a first rectifier circuit 7, an inverter 8, a step-up transformer 9, and a second rectifier circuit 10.

The first rectifier circuit 7 rectifies three-phase alternating current of 200 V to pulsating current of approx. 300 V, for example. The inverter 8 chops this pulsating current and outputs it as high-frequency alternating current of approx. 20 kHz, for example. This high-frequency alternating current is stepped up by the step-up transformer 9 so as to be high-voltage and high-frequency alternating current of approx. 10 kV. The second rectifier circuit 10 rectifies the high-voltage and high-frequency alternating current so that a peak value is equivalent to almost constant high-frequency current.

Figure 2:
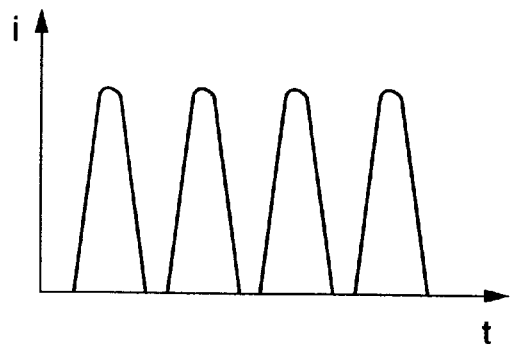
FIG. 2 is a waveform chart of electric current outputted from a second rectifier circuit shown in FIG. 1.

Referring to FIG. 2, there is shown a waveform of current output from the second rectifier circuit 10. In FIG. 2, an ordinate axis corresponds to current i and an abscissa axis to time t. The first capacitor C0 is charged with the high-frequency current. The longer the time is for which the high-frequency current flows, the higher the interpolar voltage VC is at which the first capacitor C0 is charged between the poles thereof.

The discharging circuit 3 comprises a switching element SW, a first saturable reactor L1, a second capacitor C1, a second saturable reactor L2, and a third capacitor C2.

Both of the first and second saturable reactors L1 and L2 are configured to be saturated when a product obtained by multiplying a voltage applied across each of them by a voltage application time reaches a predetermined value and to produce rapidly decreased impedance.

The switching element SW comprising a thyratron or a thyristor is connected to the laser controller 4 and the line between an input and an output will be short-circuited by an input of a trigger signal Tr from the laser controller 4. Although the trigger signal Tr is transmitted via the laser controller 4 from the processing machine 15 as shown in FIG. 1 in this embodiment, it may be generated by the laser controller 4.

When the first capacitor C0 is charged with electric charges of the interpolar voltage VC between the poles, an input of the trigger signal Tr from the processing machine 15 to the switching element SW short-circuits the switching element SW. With this short-circuiting, a voltage is applied across the first saturable reactor L1 and the first saturable reactor L1 produces decreased impedance after an elapse of a predetermined time period. The first capacitor C0, the second capacitor C1, and the first saturable reactor L1 form a first LC resonance circuit; pulse current i1 flows into the first LC resonance circuit and the electric charges applied to the first capacitor C0 shift to the second capacitor C1.

If the electric charges are applied to the second capacitor C1 between the poles, a voltage is applied across the second saturable reactor L2 and the second saturable reactor L2 produces decreased impedance after an elapse of a predetermined time period. The second and third capacitors C1 and C2 and the second saturable reactor L2 form a second LC resonance circuit; pulse current i2 flows into the second LC resonance circuit and the electric charges applied to the second capacitor C1 shift to the third capacitor C2.

At this time, an inductance of the second LC resonance circuit into which the pulse current i2 flows is adapted to be lower than an inductance of the first LC resonance circuit into which the pulse current i1 flows, and therefore the pulse current i2 has a pulse width smaller than that of the pulse current i1 so that it has a large peak value. In other words, pulse compression is performed.

If the pulse compression rate is further increased, more favorable discharging is performed between the discharge electrodes 5, 5 and therefore the LC resonance circuit comprising the second and third capacitors C1 and C2 and the second saturable reactor L2 may have a multi-stage configuration.

Afterward, when the voltage across the third capacitor C2 reaches a predetermined value, a pulse discharge occurs between the discharge electrodes 5, 5 and a laser medium is excited to oscillate the pulse laser beam 11.

The second rectifier circuit 10 has a monitoring function for monitoring the interpolar voltage VC and transmits the monitored interpolar voltage VC to the charge controller 6.

The charge controller 6 receives a target value signal VH and a charging command signal H1 from the laser controller 4. Together with the reception of the charging command signal H1, the target value included in the target value signal VH is sequentially compared to the interpolar voltage VC. If the interpolar voltage VC is higher than the target value, a charging authorization signal H2 is transmitted to the inverter 8. The inverter 8 charges the first capacitor C0 if the charging authorization signal H2 is received, while it stops charging the first capacitor C0 if the charging authorization signal H2 is not received. In other words, the charge controller 6 charges the first capacitor C0 up to the target value transmitted from the laser controller 4.

In addition, the processing machine 15 is provided with a light emitting monitor 12 for measuring a pulse light emission amount of the oscillated pulse laser beam 11. The processing machine 15 requests the laser controller 4 to output a pulse light emission request amount Px required for the next oscillated pulse laser beam 11 on the basis of the measured pulse light emission amount by means of a pulse light emission amount request signal P. The laser controller 4 calculates the final target value VF of the interpolar voltage VC applied to the first capacitor C0 at the next charging on the basis of the pulse light emission request amount Px.

Figure 3:
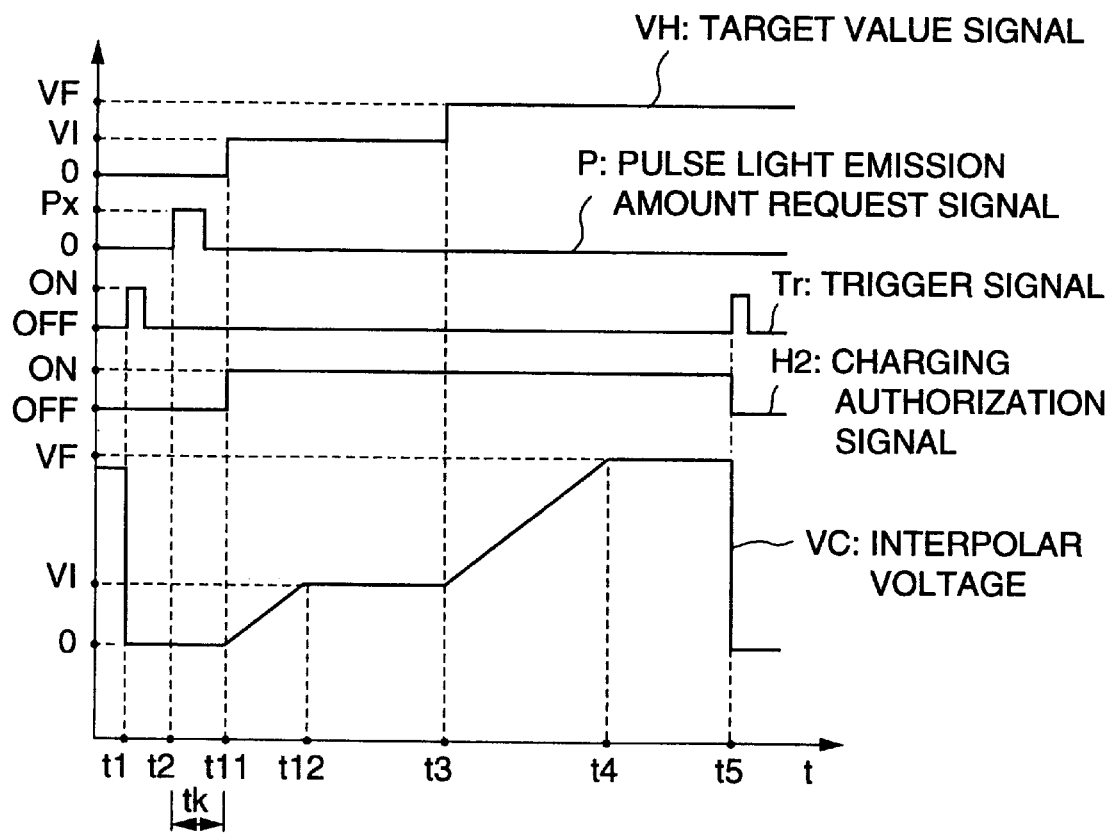
FIG. 3 is a timing chart of the charging and discharging circuit according to this embodiment.

Referring to FIG. 3, there is shown a timing chart of charging and discharging according to this embodiment.

In FIG. 3, together with an input of the trigger signal Tr at the time t1 to the discharging circuit 3, electric charges applied across the first capacitor C0 are applied to a portion between the discharge electrodes 5, 5 and the pulse laser beam 11 is oscillated.

At this time, the discharge between the discharge electrodes 5, 5 causes a counter electromotive force which is called kickback current in the charging and discharging circuit, placing the high-voltage power supply 18 in an unstable condition for a predetermined charging inhibited time tk. Therefore, the laser controller 4 inputs the charging command signal H1 to the charge controller 6 at time t11 after an elapse of the charging inhibited time tk counted from time t2. At the same time the laser controller 4 outputs a primary target value V1 predetermined as a target value of the interpolar voltage VC in the next charging to the high-voltage power supply 18 by means of a target value signal VH.

The charge controller 6 outputs the charging authorization signal H2 to the inverter 8 on the basis of the charging command signal H1. With this output, the high-voltage power supply 18 starts charging the first capacitor C0 toward the primary target value V1 at the time t11. This charging is referred to as primary charging.

The laser controller 4 receives the pulse light emission request amount Px by means of the pulse light emission amount request signal P from the light emitting monitor 12 at the time t2 after a completion of the oscillation of the pulse laser beam 11. The laser controller 4 performs an arithmetic operation for calculating the final target value VF of the interpolar voltage VC applied to the first capacitor C0 at the next pulse laser oscillation between the time t2 and the time t3 on the basis of the pulse light emission request amount Px.

The charge controller 6 sequentially compares the interpolar voltage VC monitored as described above to the primary target value V1. Although the interpolar voltage VC reaches the primary target value V1 at time t12, electric charges are naturally discharged in the first capacitor C0 and therefore the charge controller 6 continues the primary charging until the time t3 to supplement the electric charges.

At the time t3, the laser controller 4 which has calculated the final target value VF transmits the final target value VF to the high-voltage power supply 18 by means of a target value signal VH. In response to this, the high-voltage power supply 18 charges the first capacitor C0 toward the final target value VF. This charging is referred to as final charging.

Together with this operation, the charge controller 6 compares the monitored interpolar voltage VC to the final target value VF. Although the interpolar voltage VC reaches the final target value VF at the time t4, electric charges are naturally discharged in the first capacitor C0 and therefore the charge controller 6 continues the final charging until the time t5 to supplement the electric charges.

Then, at the time t5, the trigger signal Tr is inputted from the laser controller 4 to the SW to apply the electric charges accumulated in the first capacitor C0 to the portion between the discharge electrodes 5, 5. This causes the next discharging between the discharge electrodes 5, 5 to oscillate the pulse laser beam 11.

In this manner, the charging and discharging circuit starts the primary charging until the laser controller 4 calculates the final target value VF. When the final target value VF is obtained, the interpolar voltage VC is considered to be a primary target value V1. In other words, after obtaining the final target value VF, charging is started in a condition that the interpolar voltage VC is zero in the prior art, while the final charging is performed from the primary target value V1 to the final target value VF in this embodiment. Therefore, it is possible to reduce a time period from the calculation of the final target value VF to a completion of the charging.

Figure 4:
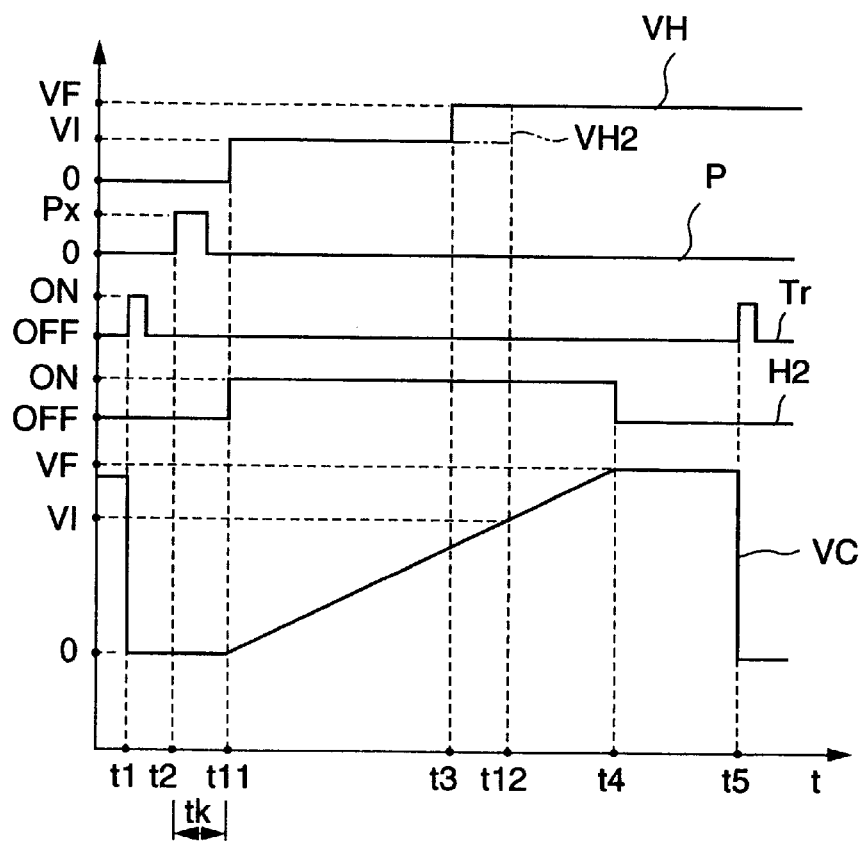
FIG. 4 is an applied example of the timing chart of the charging and discharging circuit according to this embodiment.
Figure 5:
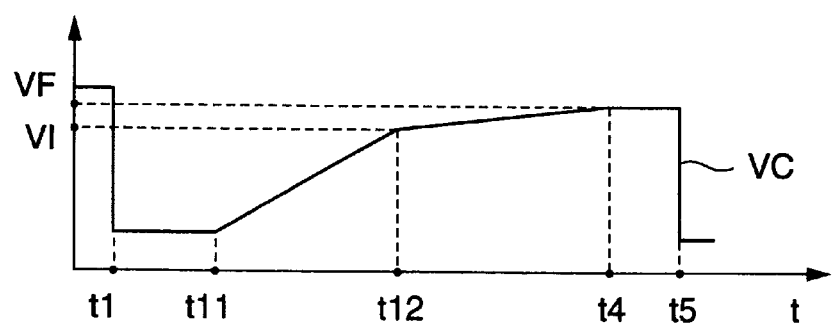
FIG. 5 is another applied example of the timing chart of the charging and discharging circuit according to this embodiment.
Figure 6:
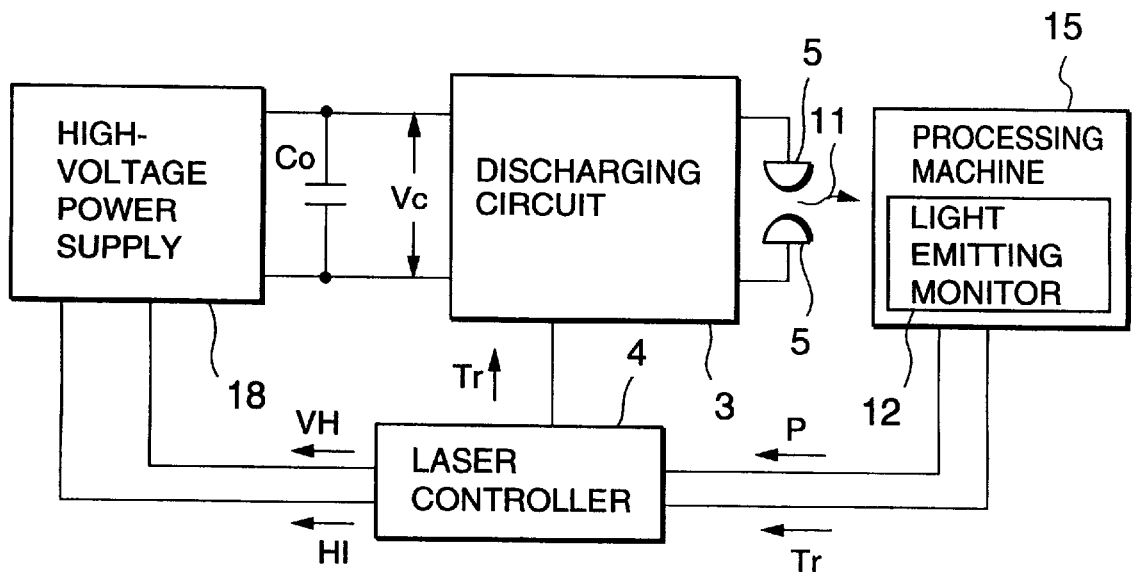
FIG. 6 is a block diagram of a charging and discharging circuit according to a prior art.
Figure 7:
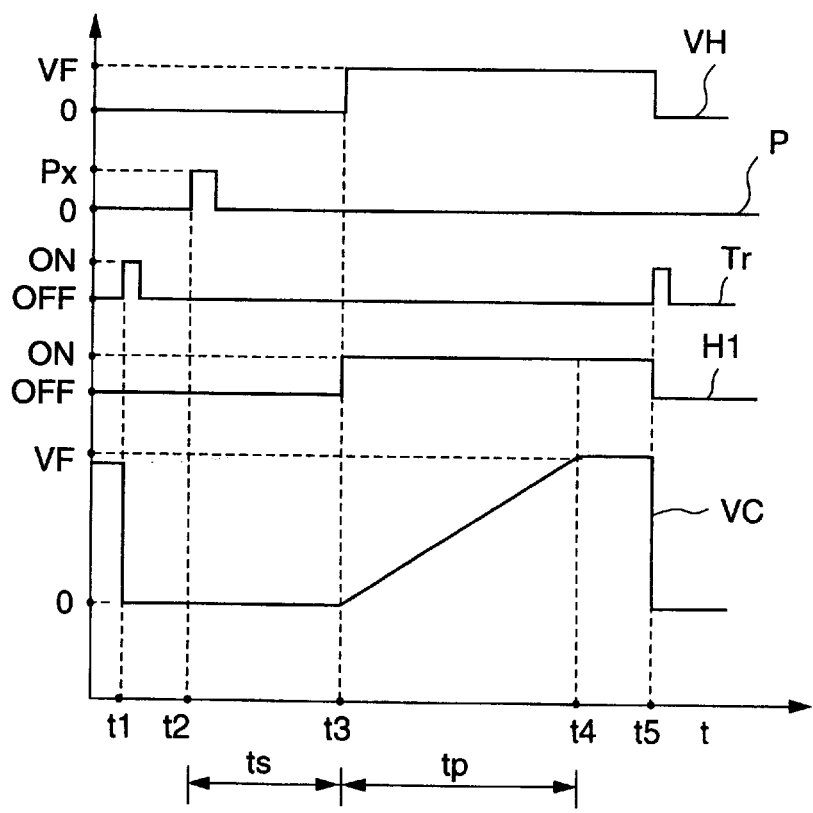
FIG. 7 is a timing chart of the charging and discharging circuit according to a prior art.

Referring to FIG. 4, there is shown an applied example of the timing chart according to this embodiment.

In FIG. 4, an operation before the time t11 is the same as for the timing chart shown in FIG. 3, and its description is omitted here. At the time t11, the high-voltage power supply 18 starts charging the first capacitor C0 on the basis of the primary target value V1 received from the laser controller 4.

In FIG. 4, the interpolar voltage VC has not reached yet the primary target value V1 at the time t3 when the final target value VF is calculated after the completion of the arithmetic operation with the laser controller 4. Therefore, the charge controller 6 compares the interpolar voltage VC to the primary target value V1 and continues to transmit a charging authorization signal H2 to the inverter 8.

When the laser controller 4 transmits the final target value VF to the charge controller 6 at the time t3, the charge controller 6 compares the interpolar voltage VC to the final target value VF. Then, it transmits a charging authorization signal H2 to the inverter 8 until the interpolar voltage VC reaches the final target value VF. As a result, the interpolar voltage VC reaches the final target value VF at the time t4 and the charging is stopped.

Alternatively, the laser controller 4 may confirm that the interpolar voltage VC has reached the primary target value V1 and may change the target value signal VH from one for the primary target value V1 to one for the final target value VF (See VH2 indicated by a chain double-dashed line in FIG. 4).

Subsequently at the time t5, the trigger signal Tr is inputted from the laser controller 4 to the SW and electric charges accumulated in the first capacitor C0 are applied to the portion between the discharge electrodes 5, 5. This causes the next discharging between the discharge electrodes 5, 5 to oscillate the pulse laser beam 11.

By setting the primary target value V1 so that the charging is performed following the timing chart, it is possible to always keep a constant charging amount per unit time (corresponding to an inclination of a VC line in FIG. 4) in charging from the time t11 when the charging is started to the time t4 when the charging is completed. In other words, a charging ability of the high-voltage power supply 18 can be used most efficiently.

As set forth hereinabove, according to this embodiment, charging is started toward the predetermined primary target value V1 before the final target value VF is calculated, and subsequently charging is continued up to the final target value VF.

In other words, when the final target value VF is calculated, the first capacitor C0 has already been charged with electric charges between its poles up to a predetermined voltage lower than the final target value VF. Accordingly, the high-voltage power supply 18 performs charging from the predetermined voltage of the interpolar voltage VC to the final target value VF after the final target value VF is calculated. Therefore, it reduces a time period required for charging after the calculation of the final target value VF, by which charging can be completed more rapidly so as to start the next discharging earlier than the conventional one. Accordingly, a time interval between discharging operations is reduced and an oscillation frequency of the pulse laser can be increased.

Additionally, the oscillation frequency can be increased without increasing an ability of performing an arithmetic operation of the laser controller 4 and a charging ability of the high-voltage power supply 18.

Furthermore, the charging the first capacitor C0 is started at the time t11 when the charging inhibited time tk has been elapsed, and therefore the charging is performed with taking a long time up to the time t4 when the charging to the final target value VF is completed. This enables the high-voltage power supply 18 having a lower charging ability per unit time to oscillate the pulse laser at the equivalent or higher oscillation frequency, by which the high-voltage power supply 18 can be downsized. In other words, it is possible to downsize a laser unit.

As the primary target value V1, it is preferable to select a value equal to or lower than the predetermined minimum charging voltage Vm. In other words, the final target value VF for charging the first capacitor C0 is always equal to or higher than the predetermined minimum charging voltage Vm in the pulse laser. It is because the final target value VF lower than the minimum charging voltage Vm makes discharging unstable, thus causing an unstable laser output.

Therefore, by setting the primary target value V1 to the minimum charging voltage Vm or lower, the final target value VF can be prevented from being equal to or lower than the primary target value V1. In other words, it is possible to prevent the pulse laser beam 11 from being oscillated by a pulse light emission amount greater than the pulse light emission amount requested by the processing machine 15.

Although the drawings used for the description of the timing charts are plotted so that a charging amount per unit time at the primary charging is always equal to one at the final charging, the present invention is not limited to this. For example, as indicated by a continuous line as another applied example, the primary charging may be rapidly performed (so that the VC line is sharply inclined) and the final charging be slowly performed.

In other words, the interpolar voltage VC at the time t12 is not related to the pulse light emission amount, and therefore it need not be the primary target value V1 precisely. Therefore, by performing the primary charging rapidly, the time for the primary charging can be reduced. In addition, by slowly performing the final charging, the interpolar voltage VC can be accurately the final target value VF, by which the pulse light emission amount of the pulse laser beam 11 can be precisely controlled.

In addition, while the light emitting monitor 12 is arranged in the processing machine 15 in this embodiment, it may be arranged in the pulse laser, for example.

What is claimed is:

1. A charging and discharging circuit for a pulse laser comprising:
   a high-voltage power supply for charging a capacitor with electric charges until an interpolar voltage VC of the capacitor reaches a final target value VF;
   a discharging circuit for discharging the electric charges in pulses between discharge electrodes to excite a laser medium and oscillating a pulse laser beam;

a pulse monitor for detecting a pulse light emission amount per pulse of the pulse laser beam; and a laser controller for calculating a final target value VF of an interpolar voltage VC for the next charging of the capacitor on the basis of the pulse light emission amount after the laser oscillation and outputting the value to the high-voltage power supply, wherein said laser controller is set to control in a manner such that said high-voltage power supply starts charging said capacitor with electric charges toward a predetermined primary target value V1 before said laser controller calculates the final target value VF of the interpolar voltage VC of said capacitor, and the charging is performed up to the calculated final target value VF after the final target value is calculated.

2. A charging and discharging circuit for a pulse laser according to claim 1, wherein said laser controller is set to control in a manner such that said high-voltage power supply starts primary charging of said capacitor with electric charges toward said primary target value V1, keeps the value which has reached the primary target value, and subsequently performs final charging of said capacitor up to said final target value VF.

3. A charging and discharging circuit for a pulse laser according to claim 1, wherein said laser controller is set to control in a manner such that said high-voltage power supply starts primary charging of said capacitor with electric charges toward said primary target value V1 and subsequently performs final charging of said capacitor up to said final target value VF so that a charging amount per unit time always keeps a constant level.

4. A charging and discharging circuit for a pulse laser according to claim 1, wherein said laser controller is set to control in a manner such that said high-voltage power supply rapidly performs primary charging of said capacitor with electric charges toward said primary target value V1 and after reaching the primary target value, gradually performs final charging of said capacitor up to said final target value VF.

* * * * *